W. R. LANDFEAR.
Breech-Loading Fire-Arm.
No. 2,581. Reissued Apr 30, 1867.
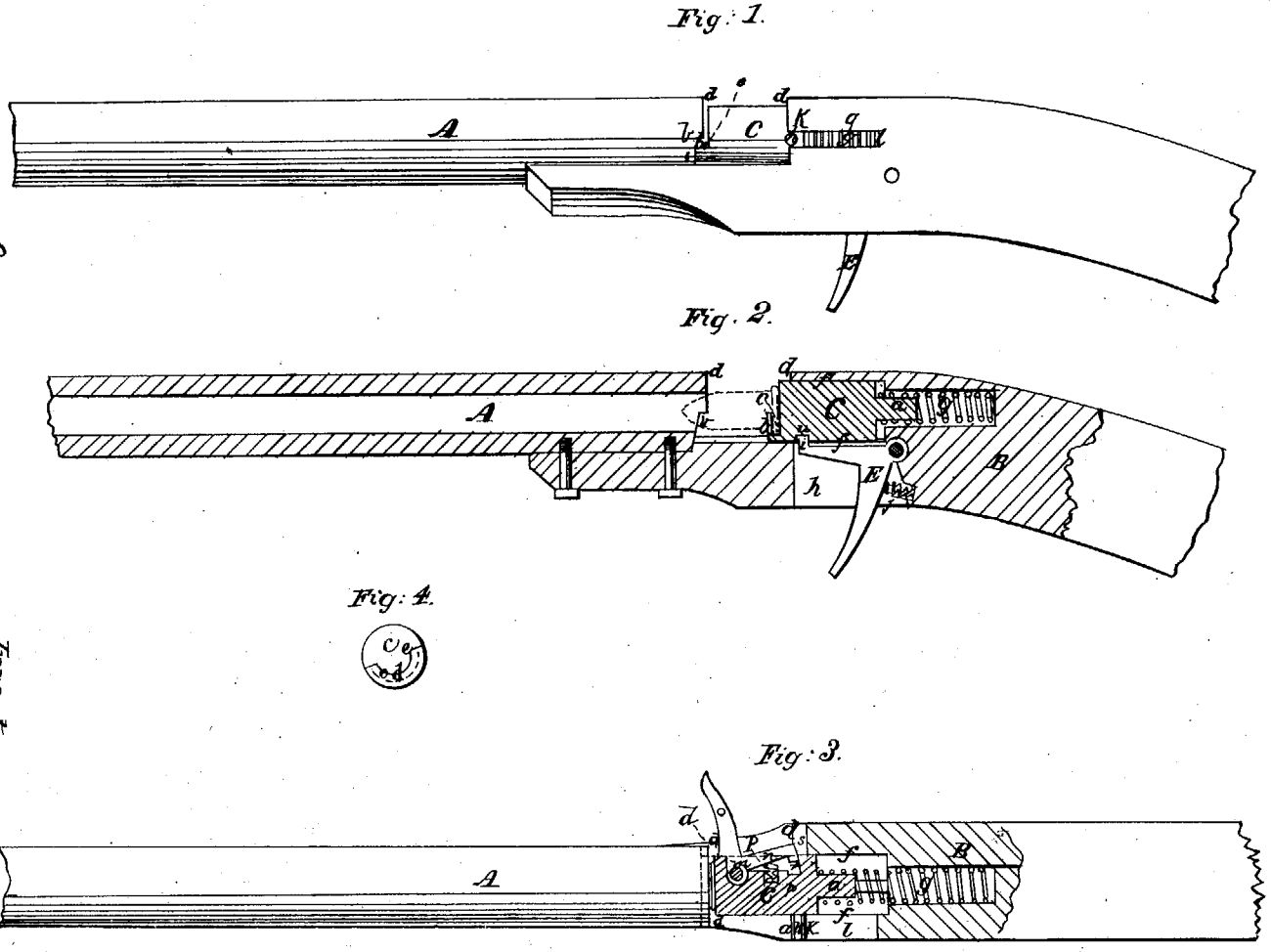
Witnesses: J. W. Coombs, A. W. Raiss
Inventor: W. R. Landfear
N. PETERS, PHOTO-LITHOGRAPHER, WASHINGTON, D. C.

UNITED STATES PATENT OFFICE.

CORNELIUS CALLAGHAN, OF BOSTON, MASSACHUSETTS, ASSIGNEE OF WM. R. LANDFEAR.

IMPROVEMENT IN BREECH-LOADING FIRE-ARMS.

Specification forming part of Letters Patent No. 44,099, dated September 6, 1864; antedated August 19, 1863.
Reissue No. 2,581, dated April 30, 1867.

*To all whom it may concern:*

Be it known that WILLIAM R. LANDFEAR, of the city of Hartford, in the county of Hartford and State of Connecticut, has invented certain new and useful Improvements in Breech-Loading Fire-Arms, of which the following is a full, clear, and exact description, reference being had to the accompanying drawings, making part of this specification.

The invention relates to the employment of a sliding breech or breech-hammer which opens and closes by a movement directly from and toward the rear of the barrel, and parallel or nearly parallel with the bore thereof; and the invention consists, primarily, in such combination and arrangement of the loading and firing mechanism that the cartridge is forced into the barrel, the breech is closed against the barrel and locked in position, and the cartridge is exploded, all at one operation, or upon release of the hammer by the trigger.

In the drawings, Figure 1 shows a side view of the breech and parts of the barrel and stock of a fire-arm with my improvements; Fig. 2, a central vertical section of the same; Fig. 3, a horizontal section of the same; Fig. 4, a front view of the breech.

Similar letters of reference indicate corresponding parts in the several figures.

A denotes the barrel; B, the metal frame by which the barrel is attached to the stock, and in which is contained the lock mechanism.

C denotes the sliding breech and hammer, consisting of a solid cylinder or block fitted to slide in a bore or chamber, *f*, in the frame, and up to and away from the rear opening of the barrel, its forward movement being effected by a spring, *g*, bearing against its rear end, said spring being shown as surrounding a tail-piece, *a*, projecting centrally from the breech. On the lower half of its front end the breech has a semi-annular projection, *b*, in the interior of which is a groove, *c*, which is made to fit the flange of the metallic cartridge with which the piece is to be loaded, the inner semi-circular face, *e*, Fig. 4, of the said projection fitting to the body of the cartridge-case. A recess, *v*, is provided in the rear end of the barrel for the reception of the projection *b* when the breech is closed.

In the top of the frame B, and directly behind the barrel, there is an opening, *d d*, of sufficient length to permit the cartridge, when the breech is drawn back or open, as shown in Fig. 2, to be placed between the breech and the barrel, with its flange in the groove *c* of the projection *b*, as shown in Fig. 2 by the dotted lines.

E denotes the trigger-lever suitably hung on a fulcrum-pin, and playing in a slot in the frame B, a trigger-spring, *j*, forcing a sear or tooth, *i*, on the front end of the trigger up against the breech-block C, and so that at proper times, or to cock the piece, the said sear shall engage with a notch, *w*, in the under side of the breech-block.

To prevent the breech from turning, it may be furnished on one side with a pin, *k*, projecting into a slot, *l*, in the side of the frame B; and the back of this slot, by acting as a stop to the said pin, serves to arrest or limit the backward movement of the breech. To one side of the breech there is shown hung upon a fulcrum-pin, *m*, a bent lever, *n o*, the arm *n* of which enters a recess or slot, *r*, in the side of the breech, while the arm *o* projects out from the opening *d d* between the barrel and the frame, like the finger-piece of a trigger. The arm *n* is pressed out when the hammer or breech is thrown forward by a spring, as shown in Fig. 3, so that when the rear of the barrel is closed the end of the said arm slides against the rear wall of the opening *d d* and locks the hammer or breech tightly and securely against the barrel, to sustain it against the recoil. A groove, *s*, at the rear of opening *d d*, serves to receive the arm *o* when the breech is drawn back; but this groove is not wide enough to prevent the end of the arm *n*, which is wider than *o*, from having a firm bearing against the frame.

With this description of the mechanism the operation of loading and firing the arm will be readily understood.

To bring the parts into position for loading, the finger-piece *o* of the lever *n* is drawn back, the pressure upon it first moving the arm *n* in against its spring, and releasing the breech C from its locked position and then allowing the breech to slide back, by continued back pressure upon the arm *o*, until the trigger-sear *i* slips into the notch *w* and cocks the piece. The cartridge is then dropped into the opening *d d*, with the end of the ball entering the barrel, and one side of the cartridge-flange entering the groove *c* in the front end of the sliding breech and hammer C, and the piece is cocked and loaded or ready to fire. To effect the firing the trigger is pulled back, releasing the hammer-breech from the sear, when the hammer with the cartridge will be driven forward by the spring *g*, simultaneously forcing the cartridge into the barrel and exploding it, and also (the blow of the flange against the end of the barrel igniting the percussion-priming contained within the flange and exploding the charge in the cartridge) simultaneously causing the arm *n* to fly out and lock the breech-hammer against the barrel, as before set forth. After firing, and when the sliding hammer-breech is again drawn back, the projection *b* at the front of the breech draws back with it the cartridge-shell and allows it to drop from the opening *d d*. A tooth may be placed upon the front end of the hammer, to penetrate or indent the cartridge-cap to insure its explosion, if desirable.

The specific mechanism described may of course be varied according to the kind of arm to which the invention is to be applied, as will be readily understood by practical fire-arm manufacturers, retaining, however, the main feature of the invention, the object of which is to simultaneously drive the cartridge into the barrel, to securely lock the breech against the barrel-chamber and the recoil, and to fire the arm at the movement of the trigger.

I claim—

1. In combination with a breech-loading arm, a mechanism by which simultaneously the cartridge is driven into the barrel, the breech-block and hammer is securely locked against the barrel, and the piece is discharged, all by drawing the trigger, substantially as set forth.

2. The lever *o n*, applied to the breech, and in combination with the opening *d d* in the frame B, substantially as and for the purpose specified.

CORNELIUS CALLAGHAN.

Witnesses:
FRANCIS GOULD,
S. B. KIDDER.